United States Patent [19]
Moss
[11] Patent Number: 4,757,117
[45] Date of Patent: Jul. 12, 1988

[54] POWDER COATING COMPOSITIONS

[75] Inventor: Noel S. Moss, Duxford, England
[73] Assignee: Ciba-Geigy Corporation, Ardsley, N.Y.

[21] Appl. No.: 40,692
[22] Filed: Apr. 17, 1987

Related U.S. Application Data

[63] Continuation of Ser. No. 765,429, Aug. 14, 1985, abandoned.

[30] Foreign Application Priority Data

Aug. 24, 1984 [GB] United Kingdom ................. 8421525

[51] Int. Cl.[4] ........................ C08L 63/02; C08L 63/04
[52] U.S. Cl. .................................... 525/483; 525/484; 525/524; 525/934
[58] Field of Search ............... 525/482, 483, 484, 524, 525/934

[56] References Cited

U.S. PATENT DOCUMENTS

| | | | |
|---|---|---|---|
| 3,367,990 | 2/1968 | Bremmer | 525/482 |
| 4,120,913 | 10/1978 | Petrie | 525/482 |
| 4,169,187 | 9/1979 | Glazar | 525/482 |
| 4,331,582 | 5/1982 | Babayan | 523/453 |
| 4,390,664 | 6/1983 | Kanayama | 525/482 |
| 4,440,914 | 4/1984 | Helfand et al. | 525/482 |
| 4,549,000 | 10/1985 | Widmer et al. | 525/482 |
| 4,552,814 | 11/1985 | Cavitt et al. | 525/482 |

FOREIGN PATENT DOCUMENTS

| | | | |
|---|---|---|---|
| 94142 | 11/1983 | European Pat. Off. . | |
| 59-217720 | 12/1984 | Japan | 525/482 |
| 81/01857 | 9/1981 | PCT Int'l Appl. . | |
| 82/00651 | 3/1982 | PCT Int'l Appl. . | |
| 1517714 | 7/1978 | United Kingdom . | |
| 2055843 | 3/1981 | United Kingdom . | |
| 2071574 | 9/1981 | United Kingdom . | |
| 2087796 | 6/1982 | United Kingdom . | |

OTHER PUBLICATIONS

Yuji et al., "Heat Resistant Epoxy Resin Composition", *Chemical Abstracts,* vol. 85, 1976, Abstract No. 34011z, p. 44.
Derwent CPI Abstract 32534x/18.
Derwent CPI Abstract 5133e/03.
Derwent CPI Abstract 25170e/13.
*Chemical Abstracts,* Dec. 12, 1981, Abstract No. 05133e/03, Tokyo Shibaura Elec. LTD, "Resin-Encapsulated Semiconductor Device."

*Primary Examiner*—John C. Bleutge
*Assistant Examiner*—Robert E. L. Sellers, II
*Attorney, Agent, or Firm*—Luther A. R. Hall

[57] ABSTRACT

Powder coating compositions suitable for use in the manufacture of laser-engraved printing rollers, comprise (a) a difunctional epoxy resin prepared from a bisphenol,
(b) an epoxy resin having an epoxide functionality greater than 2,
(c) a diaminodiphenylsulphone as hardener for the mixture of resins (a) and (b), and
(d) an imidazole as curing accelerator.

These compositions, when applied to a metal base member, fused, and cured, provide a surface that is easily engravable yet has excellent resistance to chemical attack and physical wear.

Typical difunctional epoxy resins (a) are 2,2-bis(4-glycidyloxyphenyl)propane advanced with bisphenol A, while typical epoxy resins that may be used as (b) include polyglycidyl ethers of phenol-formaldehyde novolaks. The hardener (c) my be, for example, 3,3'- and 4,4'-diaminodiphenylsulphones and the imidazole accelerator (d) may be 2-methylimidazole or benzimidazole.

16 Claims, No Drawings

POWDER COATING COMPOSITIONS

This application is a continuation of application Ser. No. 765,429, filed on Aug. 14, 1985, now abandoned.

This invention relates to new curable compositions for powder coatings, and to their use in the preparation of printing surfaces.

Surfaces used for printing, such as gravure printing, must be made of a material that can be readily engraved with the image that is to be printed, must have good solvent resistance, in order to withstand attack by components of the ink, must be wear resistant, in order to resist abrasion by the paper and by the doctor blade used to remove surplus ink, and must be dimensionally stable. Formerly, printing surfaces were made of metal, such as copper, which were etched to form the pattern by means of acids and then, to achieve good wear resistance for the longer print runs, were electroplated with chromium. Recently, however, there has been a move away from traditional materials and methods, particularly when it was found that engraving of the pattern could be carried out using a laser.

Laser engraving of a printing surface is effected using a polymeric material, such as an epoxy resin, as the surface material. When struck by a laser beam in an area the polymeric material is volatilised and so that area becomes an ink receptor for the later printing, the depth of the cut caused by the laser controlling the amount of ink held and hence the intensity of colour in the subsequent print.

It was originally found that laser engraving alone did not give a satisfactory print surface and so metal printing blanks were used in which gravure cells or grooves were present in the required pattern and of a uniform depth. A plastics material was deposited in these cells and these were then engraved to the desired depth by means of the laser. In this way actual contact between the printing roller and the paper, doctor blade etc. was confined to the metal of the roller. Such a process is described in British patent specification No. 1 517 714, and it has the advantage that long print runs are possible. However, it also suffers from several disadvantages, not the least of which is the need to use a patterned metal printing member, rather than a plain one.

The use of unpatterned metal printing members, coated with a laser-engravable polymeric surface is known, and has been described in, for example, British patent specification Nos. 2 071 574 and 2 087 796. Both of these specifications describe epoxide resin powder coatings that are applied to the substrate and then laser engraved. The novelty of these processes lies in the nature of the additives included in the powder coating compositions. In the first specification, the compositions contain 0–20% of a particulate filler and, preferably 1–5% of carbon black. In the second specification the additive is graphite, molybdenum sulphide, or polytetrafluoroethylene. The object of these specifications is to produce a material that causes less wear on the polishing tool used to impart non-print properties to the surface prior to laser engraving, whilst maintaining a high degree of wear resistance in the final printing surface. In order to achieve long print runs it was still found necessary to plate the print surface with chromium.

The incorporation of any solid additive to a resin composition used as a printing surface is considered undesirable since there is a risk that it will not give an absolutely uniform product, leading to printing defects, and the additive must be in extremely fine form to minimise the risk of non-uniform mixing. Such very fine solids are not particularly easy to handle on a large scale.

It has now been found that by a careful selection of a specific blend of epoxy resins and hardeners it is possible to obtain a stable powder coating that, when applied to print surfaces, gives an easily worked, wear resistant, dimensionally stable printing surface which does not require chromium plating, even for long print runs. The blend of epoxy resins used contains a bisphenol diglycidyl ether and a polyglycidyl derivative, and this blend is hardened using an aromatic diaminosulphone, with an imidazole accelerator.

Whilst all of the components have been used individually in the formation of powder coating compositions, the surprising advantages of the combination of these components, with regard to the preparation of printing surfaces, has not previously been disclosed. Accordingly, this invention provides a powder coating composition comprising (a) a difunctional epoxy resin prepared from a bisphenol, (b) an epoxy resin having an epoxide functionality greater than 2, (c) a diaminodiphenylsulphone as hardener for the mixture of resins (a) and (b) and (d) an imidazole as curing accelerator.

As is conventional in powder coating technology, the composition may also contain an agent that aids release of air from the coatings and so prevents voids forming in the coating surface, typically benzoin, and a flow additive, typically poly(butyl acrylate).

This invention further provides a method of making a laser engravable surface for printing, especially gravure printing, which comprises coating onto a metal base member a powder coating as described, and fusing the coating into a hardened, continuous layer. The invention also provides print surfaces made by this method.

Suitable difunctional epoxy resins that may be used as component (a) are well known and commercially available, and include bisphenol diglycidyl ethers and their advancement products with dihydric alcohols and phenols.

Bisphenol diglycidyl ethers preferred for use as component (a) have the general formula

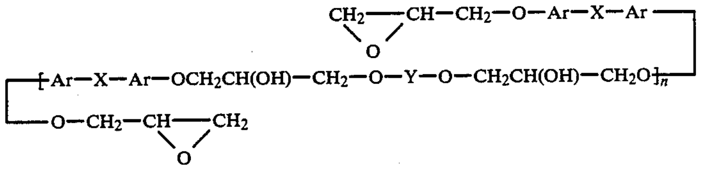

I where

Ar represents a phenylene group optionally substituted by one or two halogen atoms, X represents a covalent bond, a straight chain or branched alkyl group of from 1 to 6 carbon atoms, a carbonyl group, a sulphonyl group, an oxygen atom, or a sulphur atom, Y denotes the residue of a dihydric alcohol or dihydric phenol, after removal of the two hydroxyl groups, and n represents an integer of from 1 to 10.

Preferred bisphenol diglycidyl ethers used as component (a) have a softening point, measured on the Kofler bench, within the range 50° C. to 140° C., especially 65° to 80° C., and have an epoxide content of at least 0.5 equivalent per kilogram. Particularly preferred such resins are the diglycidyl ethers of bis(4-hydroxyphenyl)methane, 4,4'-dihydroxydiphenyl, bis(4-hydroxyphenyl)sulphone, 2,2-bis(4-hydroxphenyl)propane, and 2,2-bis(3,5-dibromo-4-hydroxyphenyl)propane, advanced by reaction with resorcinol, hydroquinone, bis(4-hydroxyphenyl)methane, 4,4'-dihydroxydiphenyl, bis(4-hydroxyphenyl)sulphone, or 2,2-bis(4-hydroxyphenyl)propane (bisphenol A).

The epoxy resin having a functionality greater than 2 that is used as componet (b) may be a polyglycidyl, or poly(beta-methylglycidyl) ester of a polycarboxylic acid such as trimellitic acid, or a polyglycidyl or poly(-beta-methylglycidyl)ether of a polyhydric phenol or alcohol such as 1,1,2,2,-tetrakis(4-hydroxyphenyl)ethane, or of novolaks formed from aldehydes such as formaldehyde, acetaldehyde, chloral and furfuraldehyde, with phenols such as phenol itself, and phenol substituted in the ring by chlorine atoms or by alkyl groups, each containing up to nine carbon atoms such as 4-chlorophenol, 2-methylphenol, and 4-tert.butyl phenol, or it may be a poly(N-glycidyl) compound such as triglycidyl isocyanurate or one prepared from epichlorohydrin and an amine containing at least three amino-hydrogen atoms such as bis(4-aminophenyl)methane and bis(4-aminophenyl)sulphone. Epoxide resins having the 1,2-epoxide groups attached to different kinds of hetero atoms may be used, e.g. the N,N,O-triglycidyl derivative of 4-aminophenol.

Preferably the epoxy resin used as component (b) is a poly(N-glycidyl) derivative of bis(4-aminophenyl)methane or is a phenolic novolak polyglycidyl ether, especially one having a softening point measured on the Kofler bench, of from 35° C. to 140° C., especially of from 65° to 100° C., those having the general formula II being especially preferred

II

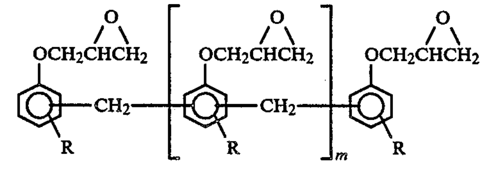

where

R represents a hydrogen atom, a halogen atom, or an alkyl or alkoxy group of 1 to 4 carbon atoms, and m represents zero or an integer of from 1 to 10.

Diaminodiphenylsulphones that may be used as the curing agent (c) are, in general, commercially available and are of the general formula

III

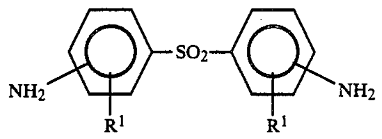

where $R^1$ represents a hydrogen atom or an alkyl group of 1 to 12 carbon atoms.

The preferred sulphones of formula III are those in which $R^1$ represents a hydrogen atom, 3,3'-diaminodiphenylsulphone and 4,4'-diaminodiphenylsulphone being particularly preferred.

Imidazole accelerators that may be used as component (d) are, in general, commercially available and are of the general formula

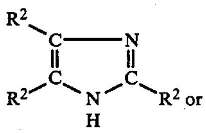

IV or

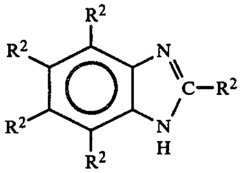

V where the various groups $R^2$ are the same or different and are selected from hydrogen and halogen atoms and alkyl, alkoxy, alkenyl, cycloalkyl, cycloaklenyl, aryl, alkaryl and aralkyl groups of from 1 to 15 carbon atoms.

Examples of suitable groups $R^2$ are methyl, ethyl, isopropyl, butyl, n-hexyl, n-octyl, n-undecyl, n-heptadecyl, methoxy, ethoxy, butoxy, allyl, cyclohexyl, cyclohexenyl, phenyl, tolyl and benzyl. Thus suitable imidazoles include 2-isopropylimidazole, 2,4-dioctylimidazole, 2-octyl-4-hexylimidazole, 4-butyl-5-ethylimidazole, 2-butoxy-4-allylimidazole, 2-cyclohexyl-4-methylimidazole, 2-n-undecylimidazole, 2-n-heptadecylimidazole and 2-benzylimidazole. Preferred imidazoles are of formula IV or V in which each $R^2$ is a hydrogen atom or at least one group $R^2$ is an alkyl group of 1 to 8 carbon atoms or a phenyl group and the remaining groups $R^2$ are hydrogen atoms, including imidazole, 2-methylimidazole, 2-ethyl-4-methylimidazole, 2-phenylimidazole, benzimidazole, 2-methylbenzimidazole and their salts with acids.

The proportions of the different compounds used in the present compositions may be varied according to their exact structure and the properties required in both the cured and uncured composition. Generally, for 100 parts by weight of the difunctional epoxy resin (a), there are used from 5 to 100 parts of the polyfunctional epoxy resin (b), 5 to 35 parts of the diaminodiphenylsulphone (c) and 0.01 to 2.0 parts of the imidazole (d).

For compositions to be used in the production of surfaces for printing paper, for 100 parts by weight of the difunctional resin (a), there are used preferably 5 to 50 parts, more preferably 10 to 40, especially 15 to 35, parts of the polyfunctional resin (b), 5 to 25, especially 10 to 20, parts of the diaminodiphenylsulphone (c) and 0.01 to 2.0 parts, especially 0.1 to 0.5 part, of the imidazole (d).

Printing surfaces for use in printing substrates such as cardboard normally require greater solvent resistance than those used in printing paper in order to withstand the effects of the more powerful solvents used in printing inks for such substrates. Compositions of the invention for use in the production of these surfaces preferably contain, for 100 parts by weight of the difuntional resin (a), 35 to 80, especially 40 to 70, parts of the polyfunctional resin (b), 15 to 35, especially 20 to 30, parts of the diaminodiphenylsulphone (c) and 0.1 to 2 parts, especially 0.2 to 1 part, of the imidazole (d).

The new compositions may be prepared by simple mixing of the ingredients, for example, in the ball mill. An alternative method of preparing them is to melt the ingredients together, preferably in an extruder such as a Buss Ko-Kneader, and then to grind the cooled mass. The compositions preferably have a particle size within the range 50-200 micrometers, especially 75-125 micrometers.

Preparation of a printing surface from these compositions may be effected by the following method:

A metallic substrate, which may be a flat sheet or, more usually, a gravure roller, is heated to a temperature of 150°-250° C. preferably 190°-220° C., and the powder is applied by conventional powder coating means, such as by electrostatic spraying or fluidised bed dipping. The powder is then fused and cured by further heating, usually at 150°-250° C. for a period of from 10 minutes to 2 hours, especially at 190°-220° C. for a period of 20 minutes to 2 hours. This results in the formation of an even coating 300-450 micrometers thick. The coated substrate is cooled and polished to an optically flat and smooth coating, by means of a diamond cutter or other conventional means. Laser engraving then follows conventionally.

The powder coatings of the invention facilitate the production of printing surfaces having remarkable wear resistance, making them suitable for long print runs, this resistance being previously unobtainable in the absence of particulate hard fillers which, as mentioned above, can cause problems at the polishing stage and at the mixing stage.

The invention will now be illustrated by the following Examples in which all parts are by weight.

EXAMPLE 1

The following are mixed at room temperature and then hot melt extruded at 90°-130° C.: 2,2-bia(4-glycidyloxyphenyl)propane advanced with bisphenol A to an epoxide content of 1.4 equivalents/kg (98 parts), polybutylacrylate flow additive (2 parts), cresol-formaldehyde novolak polyglycidyl ether having an epoxide content of 5.75 equivalents/kd (25 parts), 4,4'-diaminodiphenylsulphone (16,7 parts), 2-methylimidazole (0.22 part), and benzoin (2.1 parts). The extrudate is cooled to 25° C. and ground to a particle size below 150 micrometers.

A sample of this powder gels on heating at 200° C. for 105 seconds.

The powder is applied by electrostatic spray to steel sheets heated at 210° C., where it readily adheres. The sheets are heated for a further period, forming a laser engravable surface. They are then tested at 23° C. for abrasion resistance using a Taber Abraser (Taber Instrument Corp., North Tonawanda, N.Y., U.S.A.) having CS 17 abrasive wheels at 1000 g loading. The weight losses, per 1000 revolutions are

| Cure conditions | Weight loss |
|---|---|
| 30 minutes at 210° C. | 15 mg |
| 40 minutes at 200° C. | 17 mg |
| 60 minutes at 200° C. | 17 mg |

Solvent resistance is tested by rubbing the coatings with a cottom wool swab soaked in methylethylketone. No effect was noticed after 100 such rubs.

EXAMPLE 2

Example 1 is repeated, but the weight of 2-methylimidazole is increased to 0.32 part. Gel time at 200° C. is 70 seconds and the weight loss on abrasion, after curing at 210° C., is as follows:

| Cured for | Weight loss |
|---|---|
| 30 minutes | 18 mg |
| 45 minutes | 14 mg |

EXAMPLES 3-8

The resins used in these Examples are as follows:

Resin I: 2,2-bis(4-glycidyloxyphenyl)propane advanced with bisphenol A to an epoxide content of 1.4 equivalents/kg (99 parts) mixed with poly(butyl acrylate) (1 part) as flow additive.

Resin II: a cresol-formaldehyde novolak polyglycidyl ether having an epoxide content of 4.75 equivalents/kg and a softening point of 99° C.

Resin III: a bisphenol A—formaldehyde novolak polyglycidyl ether having an epoxide content of 4.9 equivalents/kg and a softening point of 50°-60° C.

Resin IV: a tetrakis (N-glycidyl) derivative of bis(4-aminophenyl)methane having an epoxide content of 7.8-8.2 equivalents/kg.

Resin V: a phenol-formaldehyde novolak polyglycidyl ether having an epoxide content of 5.4 equivalents/kg.

Compositions are prepared by mixing at room temperature and then hot melt extruding at 90°-130° C.: Resin I, one of Resins II to V, 4,4'-diaminodiphenylsulphone (DDS), an imidazole and benzoin. (When Resin IV or Resin V is used, it is pre-mixed with Resin I before mixing with the other ingredients.) The extrudate is cooled to 25° C. and ground to a powder having a particle size below 150 micrometers.

The powder is applied by electrostatic spray to steel sheets heated at 210° C., where it readily adheres. The sheets are heated for a further period, forming a laser engravable surface. They are then tested at 23° C. for abrasion resistance using the Taber Abraser described in Example 1.

The gel time of the powder at 180° C. is also measured and the solvent resistance of the coating is tested by the MEK rub test, in which the coating is given 100 double rubs (forwards and backwards) with a cotton wool swab soaked in methyl ethyl keton. The result is recorded on a scale of 0 to 5, 0 indicating excellent solvent resistance and 5 indicating poor solvent resistance.

The formulations and test results are shown in the following tables

| Formulations | | | | | | |
|---|---|---|---|---|---|---|
| | Parts Example No. | | | | | |
| Ingredient | 3 | 4 | 5 | 6 | 7 | 8 |
| Resin I | 600 | 600 | 500 | 600 | 600 | 600 |
| Resin II | | | | 150 | 150 | 150 |
| Resin III | 150 | | | | | |
| Resin IV | | 100 | | | | |
| Resin V | | | 200 | | | |
| DDS | 100 | 100 | 100 | 100 | 100 | 100 |
| Imidazole | | | | 1.6 | | |
| 2-Methylimidazole | 1.6 | 1.6 | 1.6 | | | |
| 2-Phenylimidazole | | | | | | 3.0 |
| Benzimidazole | | | | | 3.0 | |
| Benzoin | 12.6 | 12.6 | 12.6 | 12.6 | 12.6 | 12.6 |

| Test Results | | | | | | |
|---|---|---|---|---|---|---|
| | Result Example No. | | | | | |
| Test | 3 | 4 | 5 | 6 | 7 | 8 |
| Gel time at 180° C. (secs) | 30 | 80 | 410 | 51 | 600 | 125 |
| Coatings cured 210° C./60 min. | | | | | | |
| MEK rub test (0-5 scale) | 0 | 0-1 | 0 | 0 | 0-1 | 0-1 |
| Taber abrasion-weight loss (mg) | 19 | 22 | 20 | 19 | 18 | 20 |
| Coatings cured 210° C./90 min. | | | | | | |
| MEK rub test (0-5 scale) | 0 | 0-1 | 0 | 0 | 0 | 0 |
| Taber abrasion-weight loss (mg) | 18 | 22 | 21 | 17 | 19 | 18 |

EXAMPLE 9

The following are mixed at room temperature and then hot melt extruded at 90°-130° C.: Resin I as used in Examples 3 to 8 (500 parts), Resin II as used in Examples 6 to 8 (250 parts), 4,4'-diaminodiphenylsulphone (114 parts), 2-methylimidazole (1.6 parts) and benzoin (12.6 parts). The extrudate is cooled to 25° C. and ground to a powder having a particle size below 150 micrometers. A sample of the powder gels on heating at 180° C. for 40 seconds.

The powder is applied to steel sheets to form a laser engravable surface coating and a Taber abrasion test carried out as described in Example 1. After curing at 210° C. for 45 minutes, the weight loss, per 1000 revolutions, is 20 mg. On subjection to the MEK rub test as described for Examples 3 to 8, the solvent resistance of the coating is recorded as 0 (excellent).

EXAMPLE 10

The following are mixed at room temperature and then hot melt extruded at 90°-130° C.: Resin I as used in Examples 3 to 8 (450 parts), Resin II as used in Examples 6 to 8 (300 parts), 4,4'-diaminodiphenylsulphone (124 parts), 2-methylimidazole (1.6 parts) and benzoin (12.6 parts). The extrudate is cooled to 25° C. and ground to a powder having a particle size below 150 micrometers.

The powder is applied to steel sheets to form a laser engravable surface coating and a Taber abrasion test carried out as described in Example 1. After curing at 210° C. for 45 minutes, the weight loss, per 1000 revolutions, is 22 mg. On subjection to the MEK rub test as described for Examples 3 to 8, the solvent resistance of the coating is recorded as 0 (excellent). After immersion in a solvent comprising, by volume, 60% toluene and 40% methyl ethyl keton, the coating shows no tendency to soften, swell or shrivel.

What is claimed is:

1. A powder coating compostion which is curable to form a laser-engravable printing surface comprising (a) a difunctional epoxy resin prepared from a bisphenol, (b) an epoxy resin having an epoxide functionality greater than 2 present in an amount of 5 to 100 parts by weight per 100 parts by weight of resin (a), (c) a diaminodiphenylsulfone as hardener for the mixture of resins (a) and (b), and (d) an imidazole as curing accelerator.

2. A compositions as claimed in claim 1 containing 100 parts by weight of the difunctional epoxy resin (a), 5 to 100 parts by weight of the polyfunctional epoxy resin (b), 5 to 35 parts by weight of the diaminodiphenylsulfone (c), and 0.01 to 2 parts by weight of the imidazole (d).

3. A compositions as claimed in claim 2 containing 100 parts by weight of the difunctional epoxy resin (a), 15 to 35 parts by weight of the polyfunctional resin (b), 10 to 20 parts by weight of the diaminodiphenylsulfone (c) and 0.1 to 0.5 part by weight of the imidazole (d).

4. A compostion as claimed in claim 2 containing 100 parts by weight of the difunctional epoxy resin (a), 40 to 70 parts by weight of the polyfunctional resin (b), 20 to 30 parts by weight of the diaminodiphenylsulfone (c), and 0.2 to 1 part by weight of the imidazole (d).

5. A composition as claimed in claim 1 wherein the difunctional epoxy resin (a) is a bisphenol diglycidyl ether or an advancement product thereof with a dihydric alcohol or phenol.

6. A composition as claimed in claim 5 wherein the difunctional resin (a) is a bisphenol diglycidyl ether of formula

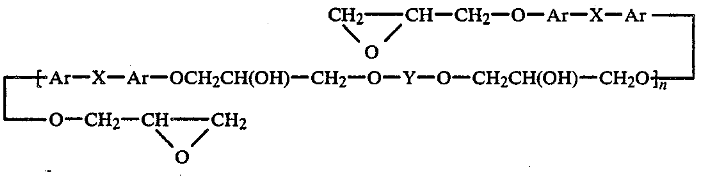

I where

Ar represents a phenylene group or said phenylene substituted by one or two halogen atoms, X represents a covalent bond, a straight chain or branched alkyl group of from 1 to 6 carbon atoms, a carbonyl group, a sulfonyl group, an oxygen atom, or a sulfur atom, Y denotes the residue of a dihydric alcohol or dihydric phenol, after removal of the two hydroxyl groups, and n represents an integer of from 1 to 10.

7. A composition as claimed in claim 6 wherein the bisphenol diglycidyl eithe (a) has a softening point within the range 50° C. to 140° C. and an epoxide content of at leat 0.5 equivalent per kilogram.

8. A composition as claimed in claim 5 wherein the bisphenol diglycidyl ether (a) is the digylcidyl ether of bis(4-hydroxphenyl) methane, 4,4'-dihydroxydiphenyl, bis(4-hydroxyphenyl)sulfone, 2,2-bis(4-hydroxyphenyl)propane, or 2,2-bis(3,5-dibromo-4-hydroxyphenyl)propane, advanced by reaction with resorcinol, hydroquinone, bis(4-hydroxyphenyl)methane, 4-4'-dehydroxydiphenyl, bis(4-hydroxyphenyl)sulfone, or 2,2-bis(4-hydroxyphenyl)propane.

9. A composition as claimed in claim 1 wherein the epoxy resin component (b) is a polyglycidyl or poly(-beta-methyl glycidyl)ester of a polycarboyxlic acid, a polyglycidyl or poly(beta-methylglycidyl) ether of a polyhydric phenol or alcohol or of a novolak formed from an aldehyde with a phenol, or it is a poly(N-glycidyl) compound.

10. A composition as claimed in claim 9 wherein the epoxy resin component (b) is a phenolic novolak polyglycidyl ether having a softening point of from 35° C. to 140° C. or a poly(N-glycidyl) derivative of bis(4-aminophenyl)methane.

11. A composition as claimed in claim 10 wherein the epoxy resin componet (b) is a polyglycidyl ether of formula

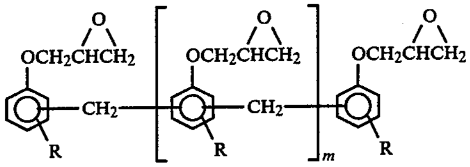

II where

R respresents a hydrogen atom, a halogen atom, or an alkyl or alkoxy group of 1 to 4 carbon atoms, and m represents zero or an integer of from 1 to 10.

12. A composition as claimed in claim 1 wherein the diaminodiphenylsulfone (c) is of the formula

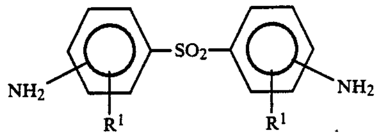

III where R[1] represents hydrogen atom or an alkyl group of 1 to 12 carbon atoms.

13. A composition as claimed in claim 12 wherein the diaminodiphenylsulfone is 3,3'-diaminodiphenylsulfone or 4,4'-diaminodiphenylsulfone.

14. A composition as claimed in claim 1 in which the imidazole accelerator (d) is of the formula

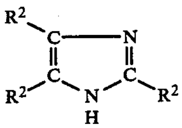

IV or

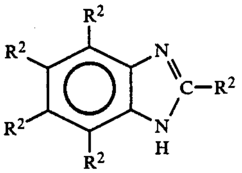

V where the various groups $R^2$ are the same or different and are selected from hydrogen and halogen atoms and alkyl, alkoxy, alkenyl, cycloaklyl, cycloalkenyl, aryl, alkaryl and aralkyl groups of from 1 to 15 carbon atoms.

15. A composition as claimed in claim 14 in which the imidazole accelerator (d) is imidazole, 2-ethyl-4-methylimidazole, 2-methylimidazole, benzimidazole, 2-methylbenzimidazol, 2-phenylimidazole or their salts with acids.

16. A composition according to claim 1 fused and hardened by heating.

* * * * *